(12) United States Patent
Huang et al.

(10) Patent No.: US 11,143,893 B2
(45) Date of Patent: Oct. 12, 2021

(54) DISPLAY DEVICE

(71) Applicant: InnoLux Corporation, Miao-Li County (TW)

(72) Inventors: Yu-Chia Huang, Miao-Li County (TW); Yuan-Lin Wu, Miao-Li County (TW); Kuan-Feng Lee, Miao-Li County (TW); Tsung-Han Tsai, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 0 days.

(21) Appl. No.: 17/014,376

(22) Filed: Sep. 8, 2020

(65) Prior Publication Data

US 2021/0103177 A1 Apr. 8, 2021

(30) Foreign Application Priority Data

Oct. 8, 2019 (CN) .......................... 201910949842.4

(51) Int. Cl.
*G02F 1/1333* (2006.01)
*G02F 1/1335* (2006.01)
*G02F 1/1368* (2006.01)

(52) U.S. Cl.
CPC ...... *G02F 1/133305* (2013.01); *G02F 1/1368* (2013.01); *G02F 1/133514* (2013.01); *G02F 2203/01* (2013.01)

(58) Field of Classification Search
CPC .................. G02F 1/133514; G02F 1/133305
See application file for complete search history.

(56) References Cited

U.S. PATENT DOCUMENTS

| | | | |
|---|---|---|---|
| 2002/0085825 A1* | 7/2002 | Kishimoto | G02B 6/1221 385/130 |
| 2005/0179828 A1* | 8/2005 | Hoshino | G02F 1/133514 349/21 |
| 2009/0224223 A1* | 9/2009 | Matsui | G02F 1/061 257/2 |
| 2014/0021462 A1* | 1/2014 | Suzuri | H01L 51/0003 257/40 |

* cited by examiner

*Primary Examiner* — Mariam Qureshi
(74) *Attorney, Agent, or Firm* — McClure, Qualey & Rodack, LLP

(57) ABSTRACT

A display device is provided, including a first flexible substrate, a second flexible substrate, a TFT circuit, and a liquid-crystal layer. The TFT circuit is formed on the first flexible substrate. The liquid-crystal layer is sealed between the first flexible substrate and the second flexible substrate. The first flexible substrate has a first light transmission chromaticity coordinates (x1, y1), and the second flexible substrate has a second light transmission chromaticity coordinates (x2, y2), wherein x1-x2≥0.002 or y1-y2≥0.002.

6 Claims, 12 Drawing Sheets

DISPLAY DEVICE

CROSS REFERENCE TO RELATED APPLICATIONS

This application claims the benefit of China Application No. 201910949842.4, filed on Oct. 8, 2019, the entirety of which is incorporated by reference herein.

BACKGROUND OF THE INVENTION

Field of the Invention

The application relates in general to a display device, and in particular to a display device that includes a plurality of substrates with different chromaticity.

Description of the Related Art

A display device is an optoelectronic device that converts an electric signal into a visible image, and the viewer can view the image information loaded in the electric signal. In recent years, display devices have become quite popular.

In the manufacturing process for a display device, a flexible substrate can be used as a display panel. At present, the industry often uses polyimide (PI) with high temperature resistance as the main body of the flexible substrate. However, the PI substrate processed by the high-temperature process is likely to cause the light emitted from the display panel to become more yellowish. Therefore, how to provide a display device that can solve the above problems has become an important issue.

BRIEF SUMMARY OF INVENTION

To address the deficiencies of conventional products, an embodiment of the disclosure provides a display device, including a first flexible substrate, a second flexible substrate, a thin-film transistor (TFT) circuit, and a liquid-crystal layer. The TFT circuit is formed on the first flexible substrate. The liquid-crystal layer is sealed between the first flexible substrate and the second flexible substrate. The first flexible substrate has a first light transmission chromaticity coordinates $(x1, y1)$, and the second flexible substrate has a second light transmission chromaticity coordinates $(x2, y2)$, wherein $x1-x2 \geq 0.002$ or $y1-y2 \geq 0.002$.

An embodiment of the disclosure provides a display device, including a first composite substrate, a second composite substrate, and a display medium layer. The first composite substrate includes a first flexible substrate and a circuit layer, wherein the circuit layer is located above the first flexible substrate and having a thin-film transistor (TFT) circuit. The second composite substrate includes a second flexible substrate. The display medium layer is sealed between the first flexible substrate and the second flexible substrate. The first composite substrate has a first light transmission chromaticity coordinates $(x1, y1)$, and the second flexible substrate has a second light transmission chromaticity coordinates $(x2, y2)$, wherein $x1-x2 \geq 0.002$ or $y1-y2 \geq 0.002$.

BRIEF DESCRIPTION OF DRAWINGS

The disclosure can be more fully understood by reading the subsequent detailed description and examples with references made to the accompanying drawings, wherein.

DETAILED DESCRIPTION OF INVENTION

Figure 1:
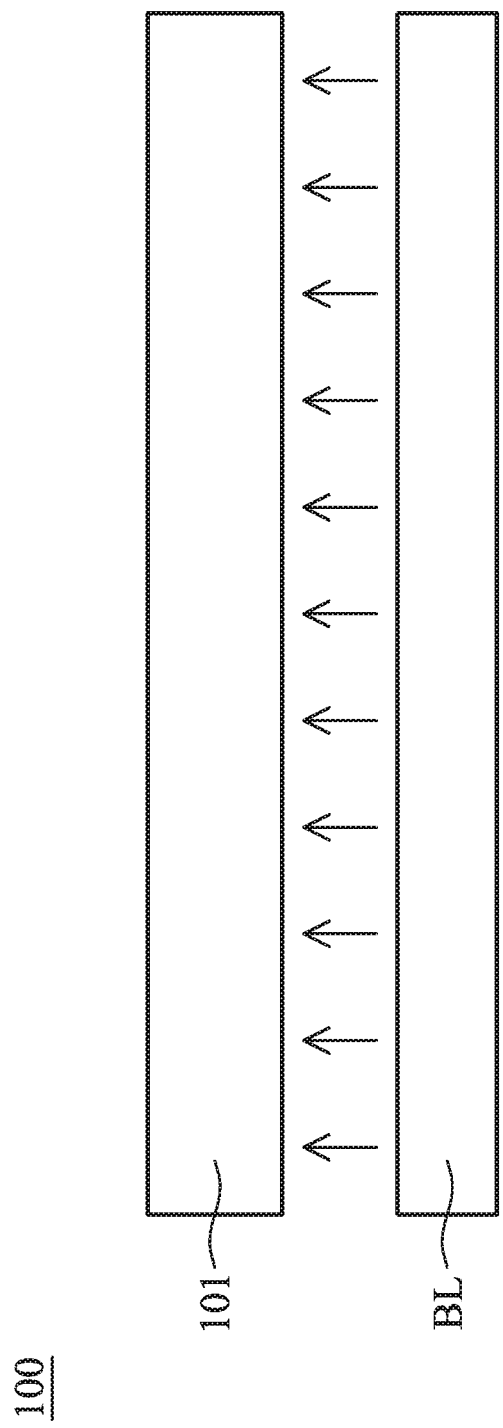
FIG. 1 is a schematic view of a display device according to the first embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that elements specifically described or illustrated may exist in various forms well known to those skilled in the art. In addition, when a layer is "on" another layer or substrate, it may mean "directly" on the other layer or substrate, or it may mean that another layer is interposed between the certain layer and the other layer or substrate.

In this specification, expressions to show the relativity are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean a value is in a range of +/−20% of a stated value, more typically +/−10% of the stated value and even more typically +/−5% of the stated value. The stated value of the present disclosure is an approximate value. When there is no specific description, the stated value includes the meaning of "about" or "substantially".

It should be noted that although in the present disclosure it uses a liquid-crystal display as an example, the type of the display devices is not limited thereto. The display device in this disclosure may include, for example, a liquid-crystal display (LCD), a light-emitting diode (LED) display, or a display using other suitable display medium. The light-emitting diode may include, for example, an organic light-emitting diode (OLED), a sub-millimeter light-emitting diode (mini LED), a micro light-emitting diode (micro LED), or a quantum dot light-emitting diode (quantum dot LED, QLED/QDLED). The display device disclosed in this disclosure may also be a tiled display device formed by splicing multiple display panels, but it is not limited thereto.

First Embodiment

Figure 2:
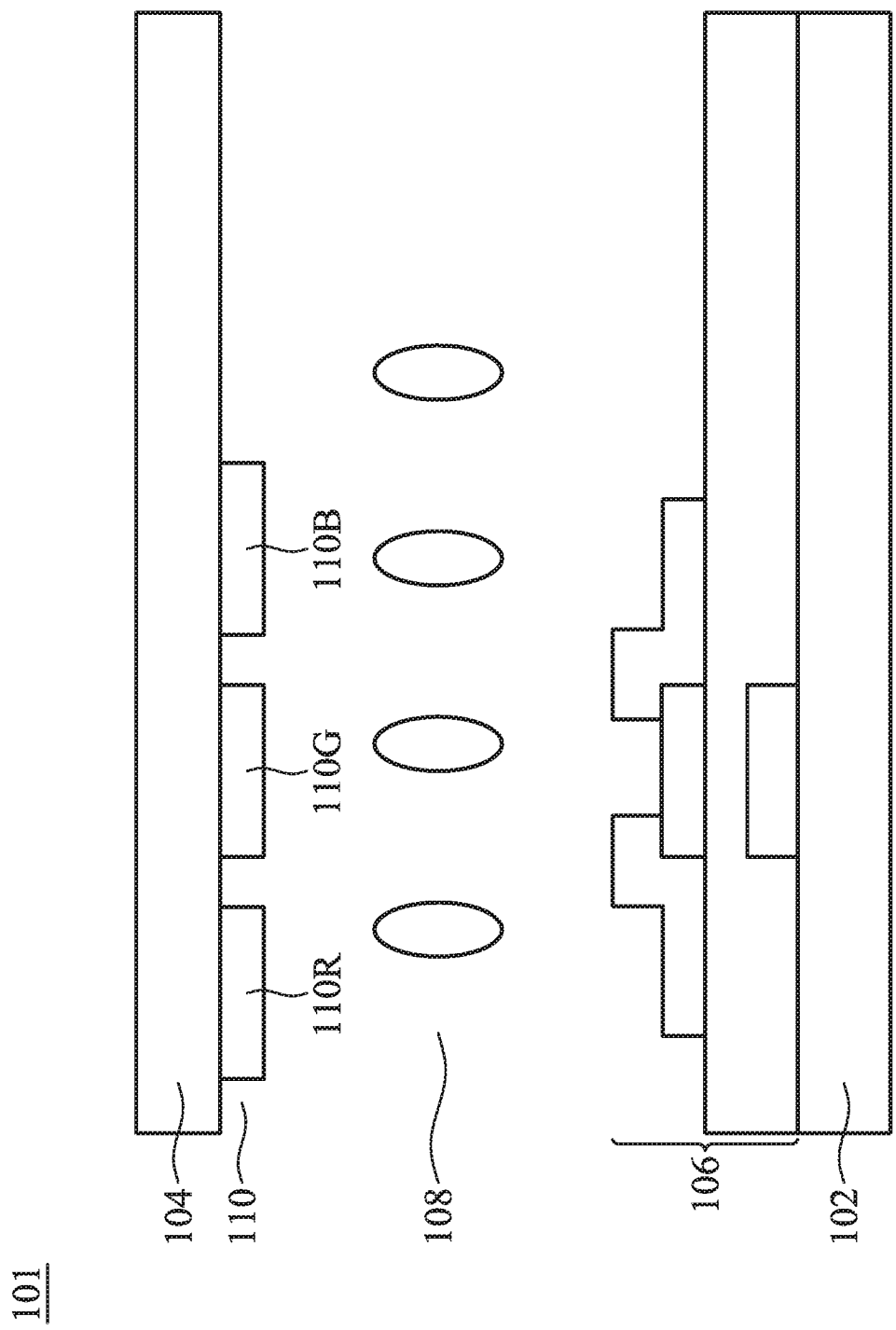
FIG. 2 is a schematic view showing the cross-sectional structure of the display panel in FIG. 1.

Referring to FIGS. 1 and 2, FIG. 1 is a schematic view showing a display device 100 according to the first embodiment of the present disclosure, and FIG. 2 is a schematic view showing a cross-sectional structure of the display panel 101 in FIG. 1. In this embodiment, the display device 100 may be a display device for displaying a picture. The display device 100 includes a display panel 101 and a backlight module BL. The display panel 101 is disposed opposite the backlight module BL.

The display panel 101 may include a first flexible substrate 102, a second flexible substrate 104, a thin film transistor circuit 106, and a display medium layer 108. The second flexible substrate 104 is disposed on the first flexible substrate 102, and the thin film transistor circuit 106 and the display medium layer 108 are disposed between the first flexible substrate 102 and the second flexible substrate 104. The thin film transistor circuit 106 is disposed between the first flexible substrate 102 and the display medium layer 108. The display medium layer 108 may be a liquid-crystal layer, but is not limited thereto. In some embodiments, the first flexible substrate 102 or the second flexible substrate 104 may be a touch substrate. It should be noted that, in this disclosure, the display medium is changed according to the type of the display device. For example, when the display device is a liquid-crystal display, the display medium may be a liquid crystal, and in an organic light-emitting diode display, the display medium may be an organic light-emitting diode (OLED). Display mediums of other types of displays are so forth.

In this embodiment, a color filter 110 can be selectively disposed between the first flexible substrate 102 and the second flexible substrate 104, but the disclosure is not limited thereto. The aforementioned color filter 110 may have filter portions such as a red filter portion 110R, a green filter portion 110G, and a blue color 110B. In other embodiments, the color filter 110 may also include filter portions of other colors (such as yellow), or include materials with light conversion characteristics (such as quantum dot materials, fluorescent materials, phosphorescent materials, or combinations thereof), but not limit thereto.

Figure 3A:
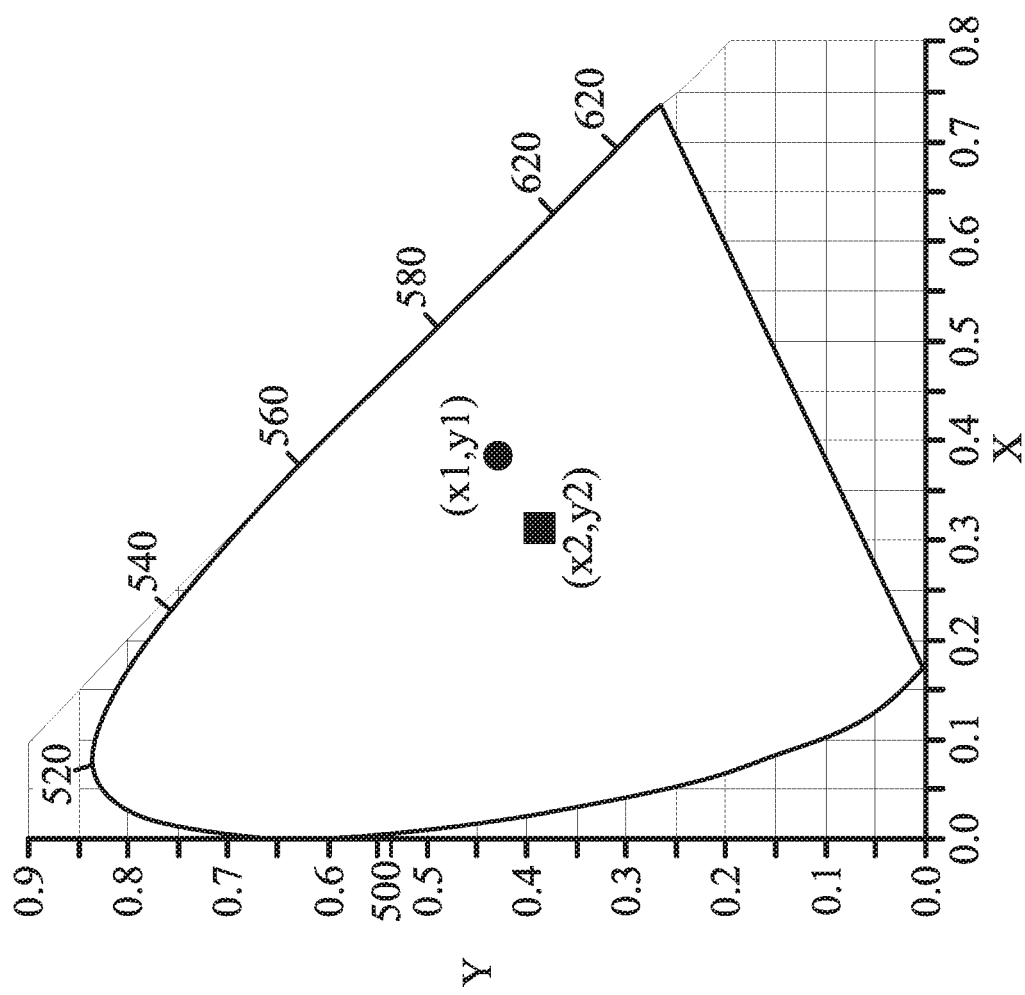
FIG. 3A is a schematic view of the first light transmission chromaticity coordinates and the second light transmission chromaticity coordinates at CIE 1931 X-Y chromaticity coordinate (or CIE 1931 chromaticity view).

In this embodiment, the first flexible substrate 102 may have a first light transmission chromaticity coordinates (x1, y1) on the CIE 1931 xy chromaticity coordinates, and the second flexible substrate 104 is in the CIE 1931 and may have a second light transmission chromaticity coordinates (x2, y2), as shown in FIG. 3A. For example, a film color point measurement method can be used to measure the light transmission chromaticity coordinates of the aforementioned substrate: this measurement method uses a reference light source to illuminate a substrate to be measured, and the reference light emitted by the reference light source has a first spectral intensity distribution in which there is respectively a light intensity value at every wavelength value. The reference light becomes a penetrating light after penetrating the substrate to be tested, and the penetrating light has a second spectral intensity distribution in which there is respectively another light intensity value at every wavelength value. And divide the second spectral intensity distribution of the transmitted light by the first spectral intensity distribution of the reference light (that is, start from the shortest wavelength, and gradually calculate the intensity ratio of the penetrating light and the reference light at the same wavelength value until the longest wavelength), then a third spectral intensity distribution can be obtained. Finally, according to the third spectral intensity distribution, the light transmission chromaticity coordinate value of the penetrating light is calculated.

As shown in FIG. 3A, in an embodiment, the second light transmission chromaticity coordinates (x2, y2) are located at a lower left location of the first light transmission chromaticity coordinates (x1, y1), which means that in this embodiment, the second flexible substrate 104 is more bluish than the first flexible substrate 102. The difference in chromaticity between the two substrates can be obtained due to the process difference experienced by the first flexible substrate 102 and the second flexible substrate 104 or obtained by other methods. The way to make the chromaticity difference will be detailed later.

In this way, when the backlight module BL illuminates the display panel 101, since there is a chromaticity difference between the first flexible substrate 102 and the second flexible substrate 104, the light color of the display panel 101 is compensated. That is, the chromaticity coordinates of the light color of the display panel 101 are located between the first light transmission chromaticity coordinates and the second light transmission chromaticity coordinates. In the present disclosure, by compensating for the light color of the display panel 101, the phenomenon that the light color of the display device 100 with originally used PI is more yellowish can be improved.

Figure 3B:
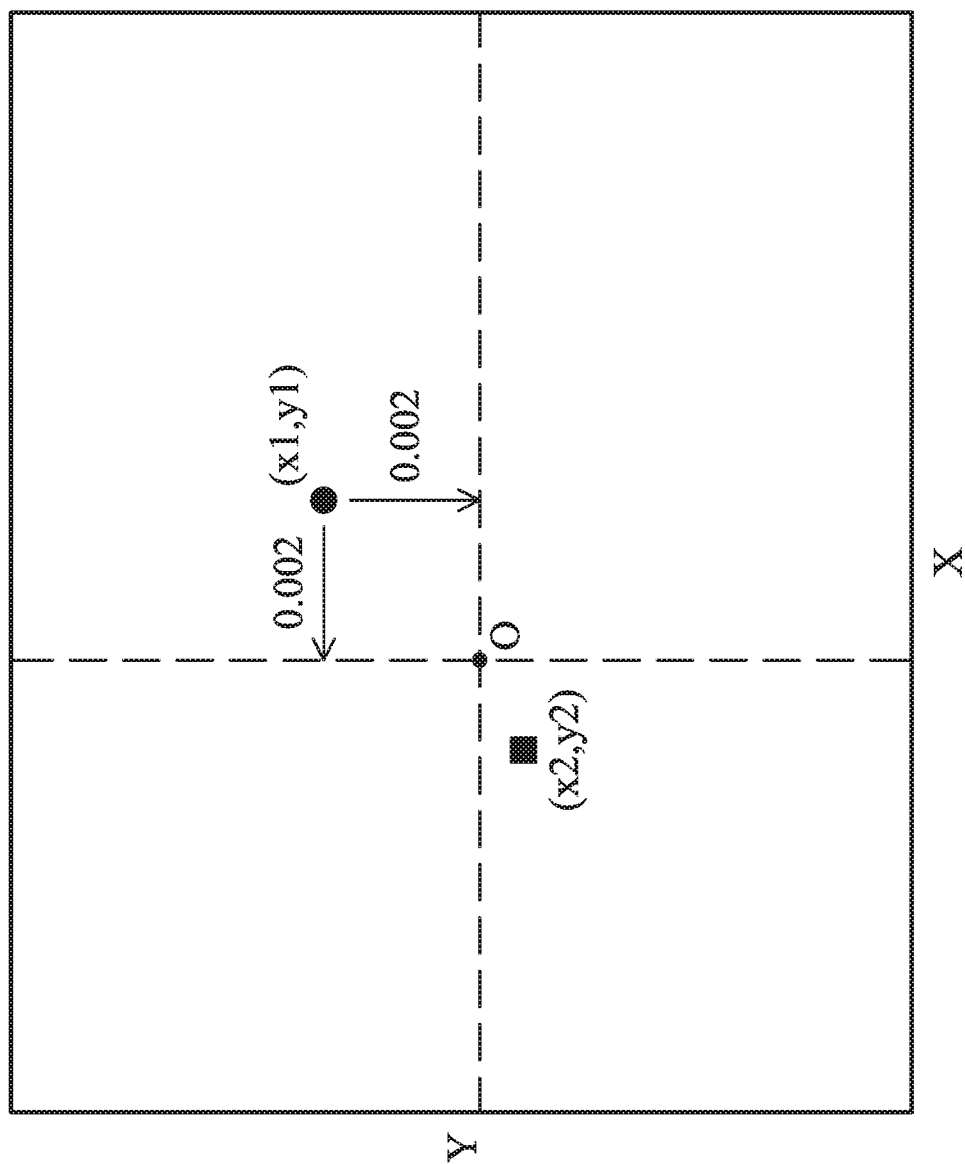
FIG. 3B is a schematic view showing an original point O set by moving 0.002 units along the −X axis direction and 002 units along the −Y axis direction from the first light transmission chromaticity coordinates $(x1, y1)$.

In the embodiment of the present disclosure, the difference between the first light transmission chromaticity coordinates (x1, y1) and the second light transmission chromaticity coordinates (x2, y2) can be seen in FIG. 3B. Starting from the first light transmission chromaticity coordinates (x1, y1), and moving 0.002 units along the −X axis and 002 units along the −Y axis, the origin point O is set, i.e. the chromaticity coordinates origin O are (x1-0.002, y1-0.002), and four quadrants are defined. As shown in FIG. 3B, when the first light transmission chromaticity coordinates (x1, y1) are in the first quadrant and the second light transmission chromaticity coordinates (x2, y2) are in the third quadrant, we may get x1-x2>0.002 and y1−y2>0.002.

In some embodiments, the second light transmission chromaticity coordinates of the second flexible substrate 104 may fall within the second quadrant, the fourth quadrant, or the origin point O. That is, x1-x2≥0.002 or y1-y2≥0.002, or $x1-x2\geq0.002$ and $y1-y2\geq0.002$. In this way, the color of the light emitted from the display device 100 can be compensated. In some embodiments, $x1-x2\geq0.005$ or $y1-y2\geq0.005$. In other embodiments, $0.002\leq x1-x2\leq0.030$ or $0.002\leq y1-y2\leq0.030$.

The following provides various ways to adjust the first light transmission chromaticity coordinates (x1, y1) or the second light transmission chromaticity coordinates (x2, y2).

Figure 4A:
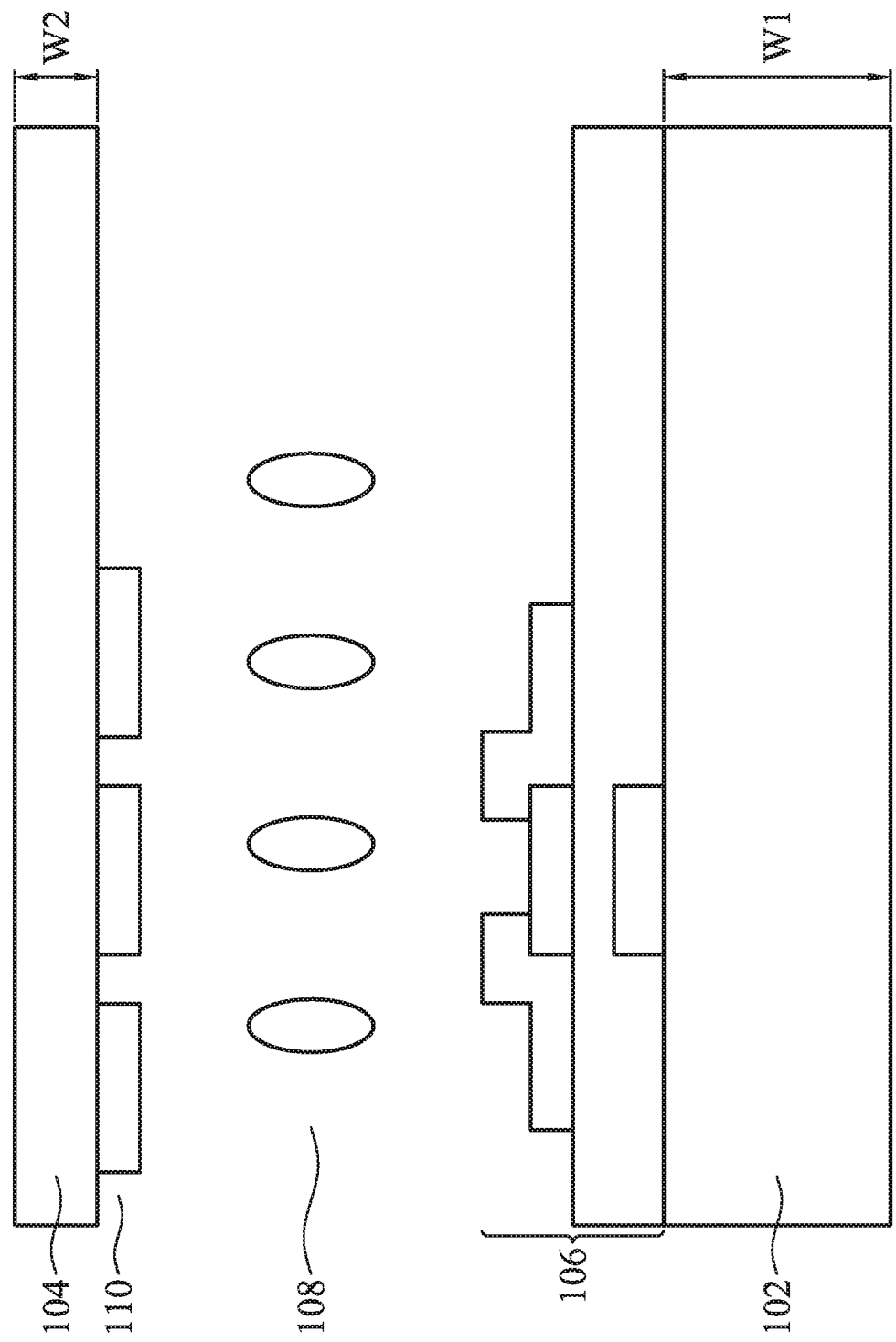
FIG. 4A is a schematic view showing a variation of the first flexible substrate in the first embodiment.

FIG. 4A shows a variation of the first flexible substrate 102. As shown in FIG. 4A, the thickness w1 of the first flexible substrate 102 is thicker than the thickness w2 of the second flexible substrate 104. For example, in some embodiments, the thickness w1 of the first flexible substrate 102 is 10% to 100% thicker than that of the second flexible substrate 104. In this embodiment, the second flexible substrate 104 may has a thickness of about 10 μm, but it is not limited to this. When a difference in chromaticity already exists between the first flexible substrate 102 and the second flexible substrate 104 (that is, the first flexible substrate 102 of the same thickness is relatively yellowish), increasing the thickness of the flexible substrate 102 will make it more yellowish in the CIE 1931 xy chromaticity coordinates (i.e., the first light transmission chromaticity coordinates (x1, y1) moves to the upper right) to achieve the condition: $x1-x2\geq0.002$ or $y1-y2\geq0.002$, or $x1-x2\geq0.002$ and $y1-y2\geq0.002$.

Figure 4B:
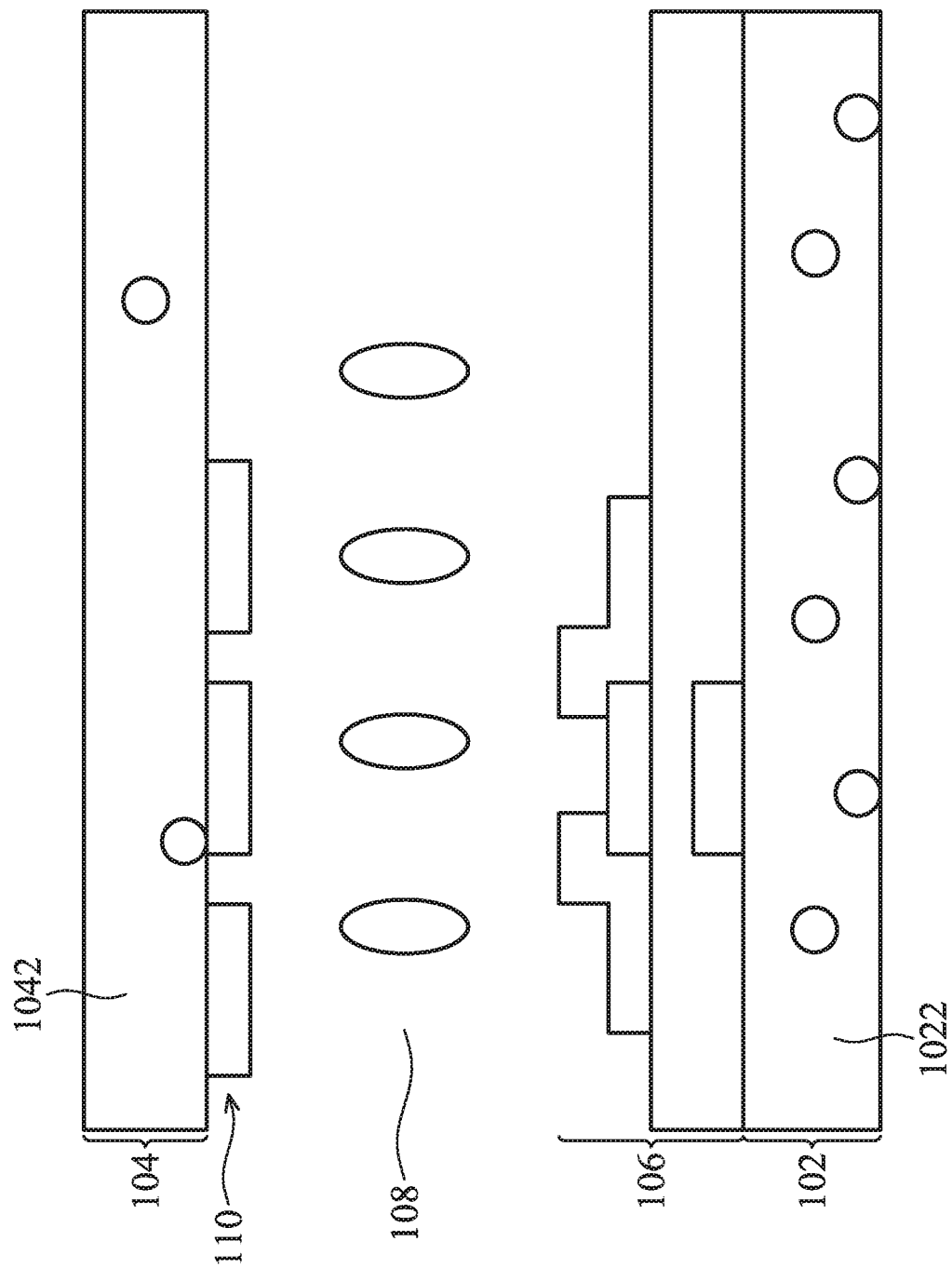
FIG. 4B is a schematic view showing that the first flexible substrate and the second flexible substrate are doped with elements in different concentrations.

FIG. 4B is a schematic view showing that the first flexible substrate 102 and the second flexible substrate 104 are doped with different concentrations of the elements. The first flexible substrate 102 includes a first polymer layer 1022, and the second flexible substrate 104 includes a second polymer layer 1042. The first polymer layer 1022 and the second polymer layer 1042 may respectively include a first atomic concentration and a second atomic concentration of at least one element of Si, F, Ge, and C, wherein the first atomic concentration is greater than the second atom concentration. Since the elements of Si, F, Ge, and C will increase the transition energy, this means that when the concentration of at least one of the above elements in the flexible substrate is high, the wavelength of the light which passes through the substrate will become longer, and the overall substrate will be more yellowish; on the contrary, if the concentration of at least one of the above elements becomes low, the wavelength of light passing through the substrate will become shorter, and the overall substrate is more bluish. In this way, the first flexible substrate 102 and the second flexible substrate 104 can have a chromaticity difference. In this embodiment, the element concentration may be adjusted in the above manner, and the difference between the first light transmission chromaticity coordinates (x1, y1) and the second light transmission chromaticity coordinates (x2, y2) may be in the condition: $x1-x2\geq0.002$ or $y1-y2\geq0.002$, or $x1-x2\geq0.002$ and $y1-y2\geq0.002$. In another embodiment, $0.002\leq x1-x2\leq0.030$ and/or $0.002\leq y1-y2\leq0.030$. It should be noted that the addition of elements such as Si, F, Ge, and C to the flexible substrate can adjust the light transmission chromaticity coordinates of the substrate. Therefore, when a flexible substrate (such as the first flexible substrate 102) is excessively yellowed due to processing temperature or other factors, by adjusting the difference in atomic concentration between the substrate (such as the first flexible substrate 102) and another substrate (such as the second flexible substrate 104), for example, the first atomic concentration in the first flexible substrate 102 is less than the second atomic concentration in the second flexible substrate 104, the difference between the first light transmission chromaticity coordinates (x1, y1) of the first flexible substrate 102 and the second light transmission chromaticity coordinates (x2, y2) of the second flexible substrate 104 may fall within an appropriate range, for example, $0.002\leq x1-x2\leq0.030$ and/or $0.002\leq y1-y2\leq0.030$.

Figure 4C:
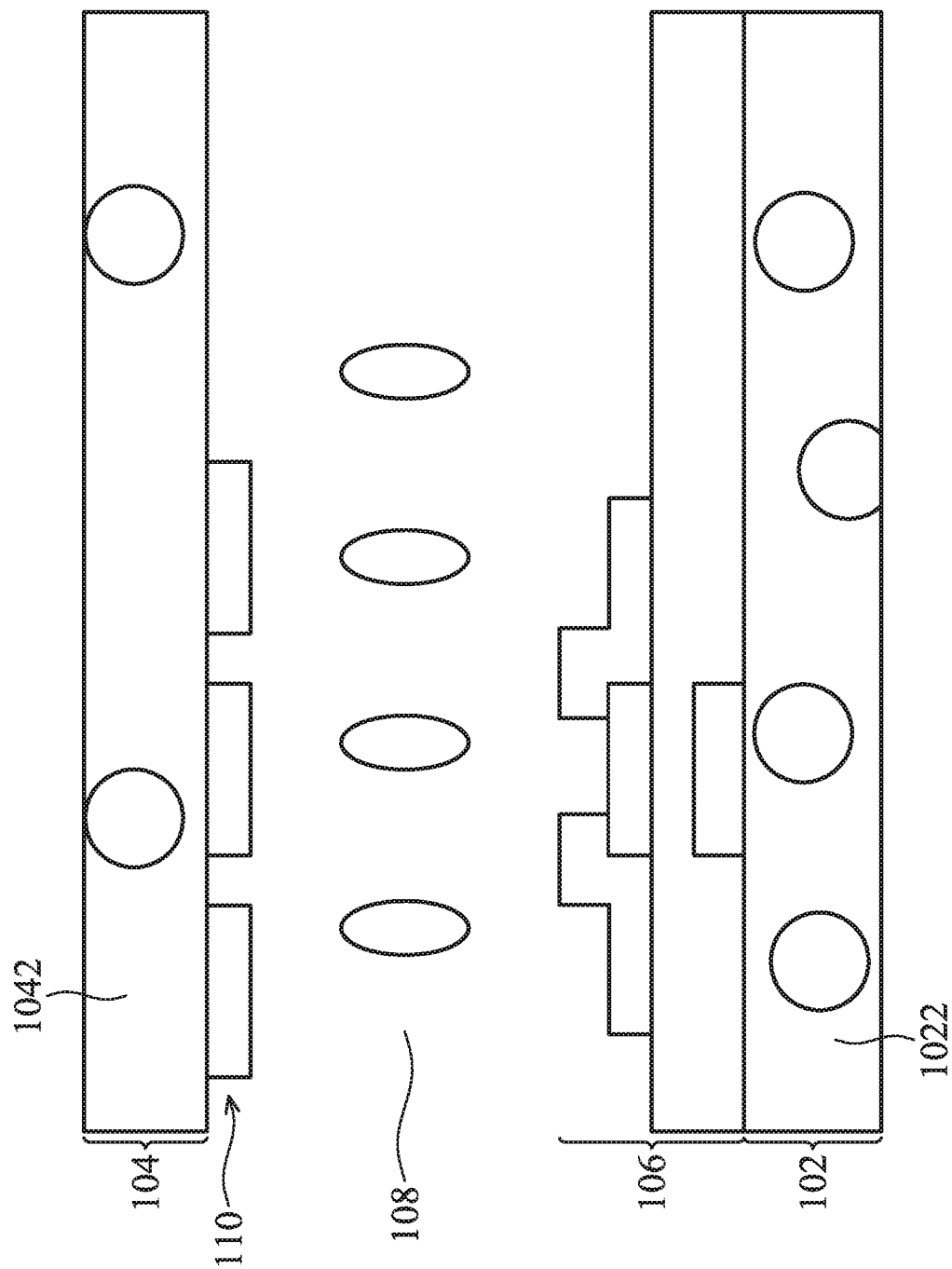
FIG. 4C is a schematic view showing that the first flexible substrate and the second flexible substrate are doped with molecular polymers in different concentrations.

FIG. 4C shows a schematic view showing the aforementioned first polymer layer 1022 and second polymer layer 1042 are doped with different concentrations (or numbers) of conjugated double bond polymers. In some embodiments, the conjugated double bond polymer contained in the first polymer layer has a first concentration, the conjugated double bond polymer contained in the second polymer layer has a second concentration, and the first concentration is different from the second concentration. Similar to the method of adjusting the wavelength of light by adjusting the element concentration of at least one of Si, F, Ge, and C in the embodiment of FIG. 4B, in this embodiment, a higher concentration of a polymer containing conjugated double bonds is added, for example, the benzene ring, can also make the substrate more yellowish. The above manner causes a chromaticity difference between the first flexible substrate 102 and the second flexible substrate 104. In another embodiment, the concentrations of the triple bond polymer of the first flexible substrate 102 and the second flexible substrate 104, such as benzonitrile ($C_6H_5CN$), may be adjusted, and a chromaticity difference is between the first flexible substrate 102 and the second flexible substrate 104. That is, the conjugated triple bond polymer contained in the first polymer layer has a first concentration different from the second concentration of the conjugated triple bond polymer contained in the second polymer layer. The concentration of aforementioned elements or molecules in the substrate can measured by observing the characteristics of absorption or transition energy with a material analyzer, such as Fourier transform infrared spectrometer (FTIR), X-ray photoelectron spectrometer (XPS), near-edge X-ray analysis (NEXR), etc.

Figure 5:
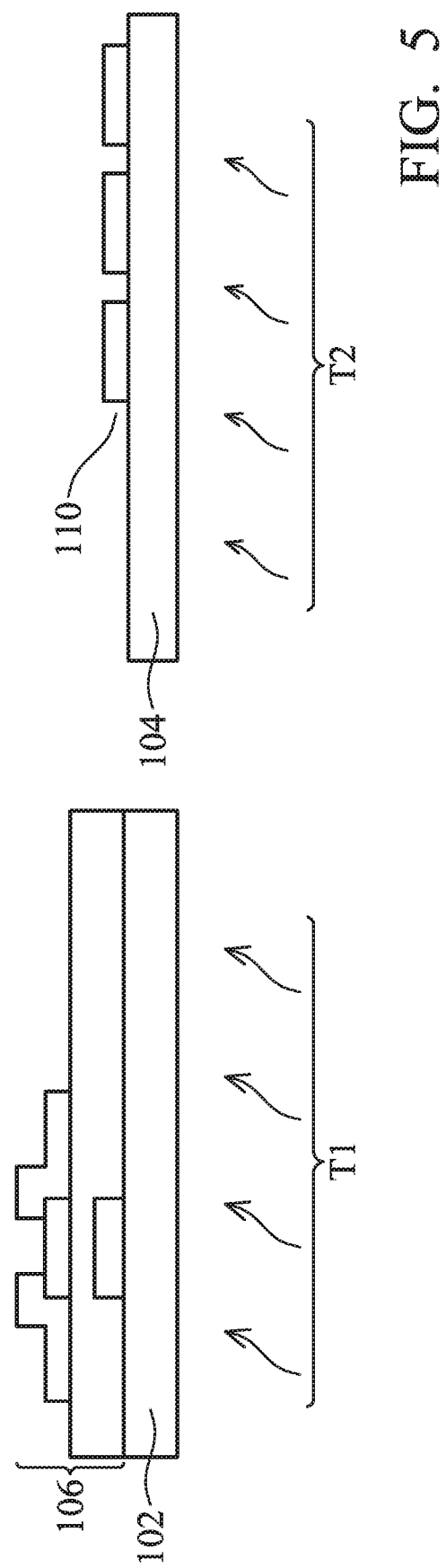
FIG. 5 shows a schematic view showing that the first flexible substrate undergoes a first processing temperature and the second flexible substrate undergoes a second processing temperature.

FIG. 5 shows that the first flexible substrate 102 may undergo a process with a first processing temperature of T1, and the second flexible substrate 104 may undergo a process with a second processing temperature of T2. Since the general flexible substrate contains polyimide (PI) material, the higher the temperature of the process which the polyimide undergoes, the more yellowish the color of the substrate after processing is measured (that is, the light transmission chromaticity coordinates of the light through the substrate is more yellowish). Therefore, due to the difference between the first processing temperature T1 and the second processing temperature T2, the chromaticity of the first flexible substrate 102 and the second flexible substrate 104 may be different. In this embodiment, the first processing temperature T1 is greater than the second processing temperature T2.

It should be noted that the above-mentioned methods of adjusting the substrate thickness (FIG. 4A), doping with different concentrations of specific elements (FIG. 4B), doping with different proportions of double or triple bond polymers (FIG. 4C), and undergoing different processing temperatures (FIG. 5) can be combined with each other, and the difference between the first light transmission chromaticity coordinates (x1, y1) and the second light transmission chromaticity coordinates (x2, y2) is: $x1-x2\geq0.002$ or $y1-y2\geq0.002$, or $x1-x2\geq0.002$ and $y1-y2\geq0.002$. In another embodiment, $0.002\leq x1-x2\leq0.030$ and/or $0.002\leq y1-y2\leq0.030$.

Second Embodiment

Figure 6:
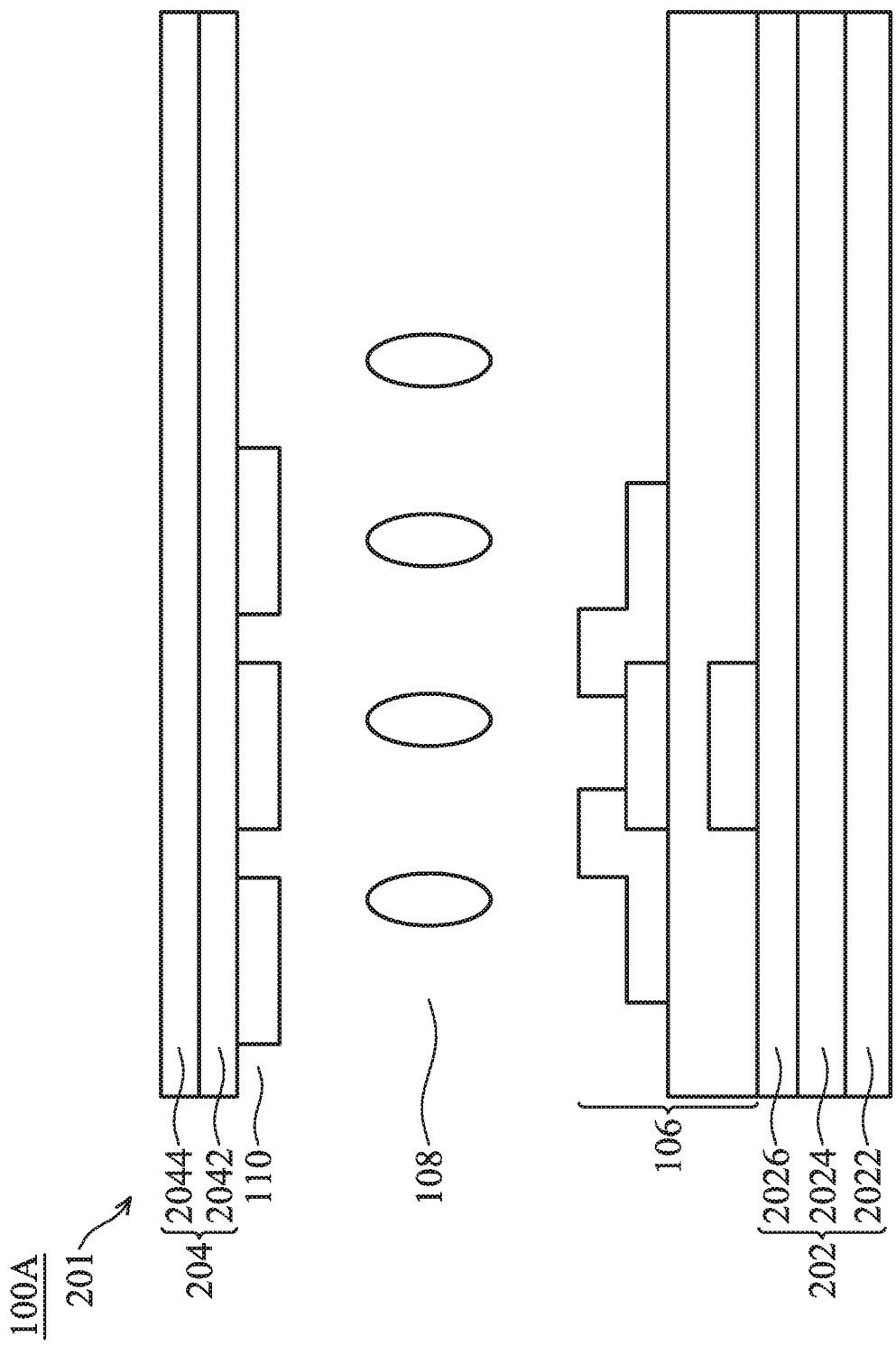
FIG. 6 is a schematic view of a display device according to the second embodiment of the present disclosure.

Please refer to FIG. 6, which is a schematic view of a display device 100A according to a second embodiment of the present disclosure (where the backlight module BL is omitted). Compared to the foregoing first embodiment (FIG. 2), the first flexible substrate 202 and the second flexible substrate 204 of the display panel 201 in the display device 100A include a multi-layer structure respectively. The first flexible substrate 202 includes a first layer 2022, a second layer 2024 and a third layer 2026. The second flexible substrate 204 includes a fourth layer 2042 and a fifth layer 2044, but the number of layers included in the first flexible substrate 202 and the second flexible substrate 202 is not limited to this. In the aforementioned five layers (the first layer 2022 to the fifth layer 2044), two of the layers need to be flexible substrate layers, the other three layers can be selected to be specific functional layers according to actual needs, such as diffuser film(s) to increase viewing angle, brightness enhancement film(s) to increase brightness, optical film(s), protective layer(s), stress balance layer(s), planarization layer(s), buffer layer(s), or other layers with specific functions. In addition, it should also be noted that the type and/or stacking order of each layer in this embodiment can be adjusted according to actual needs. For example, in an embodiment, the display panel 201 includes: the first layer 2022 as a first flexible substrate layer, the second layer 2024 as a stress balance layer, the third layer 2026 as a planarization layer, and the fourth layer 2042 as a protective layer, and the fifth layer 2044 as a second flexible substrate layer. In another embodiment, the display panel 201 includes: the first layer 2022 as a stress balance layer, the second layer 2024 as a first flexible substrate layer, the third layer 2026 as a buffer layer, the fourth layer 2042 as a second flexible substrate layer, and the fifth layer 2044 as a stress balance layer. That is to say, in some embodiments, the flexible substrate layer may be located between two other layers, or the flexible substrate layer may be located between the display medium layer 108 and other layers.

As shown by FIG. 6, the first flexible substrate 202 includes three layers (layers 2022, 2024, and 2026), and the second flexible substrate 204 includes two layers (layers 2042, 2044). Since each layer may have its own different refractive index, it will interfere with different wavelengths. The overall chromaticity of the first flexible substrate 202 and the second flexible substrate 204 may change independently, resulting in a chromaticity difference, for example, $x1-x2 \geq 0.002$ and/or $y1-y2 \geq 0.002$. In another embodiment, $0.002 \leq x1-x2 \leq 0.030$ and/or $0.002 \leq y1-y2 \leq 0.030$.

Third Embodiment

Figure 7:
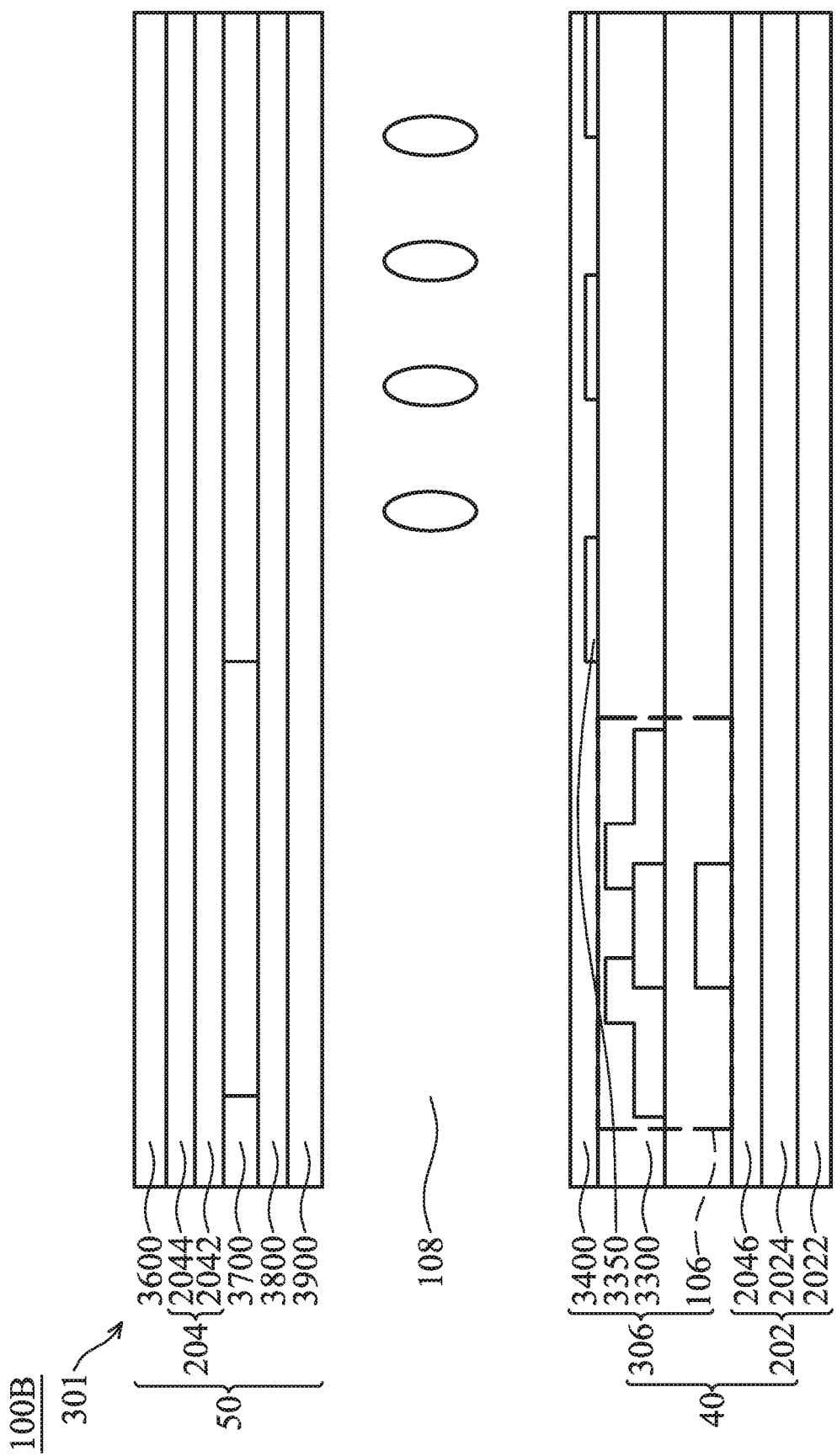
FIG. 7 is a schematic view of a display device according to the third embodiment of the present disclosure.

Please refer to FIG. 7, which is a schematic view of a display device 100B according to a third embodiment of the present disclosure (where the backlight module BL is omitted). Compared with the second embodiment (FIG. 6), other layers are added between the first flexible substrate 202 and the display medium layer 108, and between the second flexible substrate 204 and the display medium layer 108 in this embodiment. For example, a circuit layer 306 is provided on the first flexible substrate 202 of the display panel 301 in the display device 100B, wherein the circuit layer 306 includes a thin-film transistor (TFT) circuit 106, an insulating layer 3300, an electrode layer 3350 and a first alignment layer 3400. A color filter layer 3700, an overcoat layer 3800, and a second alignment layer 3900 are also included between the second flexible substrate 204 and the display medium layer 108, and a protective layer 3600 is located above the fifth layer 2044. It should be noted that, in this embodiment, the layers adjacent to the first flexible substrate 202 or the second flexible substrate 204 are not limited to the layers shown in FIG. 7.

The aforementioned first flexible substrate 202 and the circuit layer 306 (but not limited to) may be comprised in a first composite substrate 40. By the aforementioned film color point measurement method, a penetrating light (the light emitted by the reference light source and penetrating the first composite substrate 40) is measured to obtain a first light transmission chromaticity coordinates (x1, y1). The second flexible substrate 204 and other adjacent layers can be comprised in a second composite substrate 50. By measuring the penetrating light (the light emitted by the reference light source and penetrating the second composite substrate 50), the second light transmission chromaticity coordinates (x2, y2) is obtained.

Based on the foregoing embodiments, the chromaticity difference range of the first composite substrate 40 and the second composite substrate 50 may be $x1-x2 \geq 0.002$ and/or $y1-y2 \geq 0.002$. In another embodiment, $0.002 \leq x1-x2 \leq 0.030$ and/or $0.002 \leq y1-y2 \leq 0.030$. It should be noted that when measuring the light transmission chromaticity coordinates, the measurement point needs to be carefully selected and the light emitted by the reference light source does not pass through the color filters, metal, black matrix and any other parts with opaque materials in the composite substrate, and not to affect the finally measured light transmission chromaticity coordinates.

Fourth Embodiment

Figure 8:
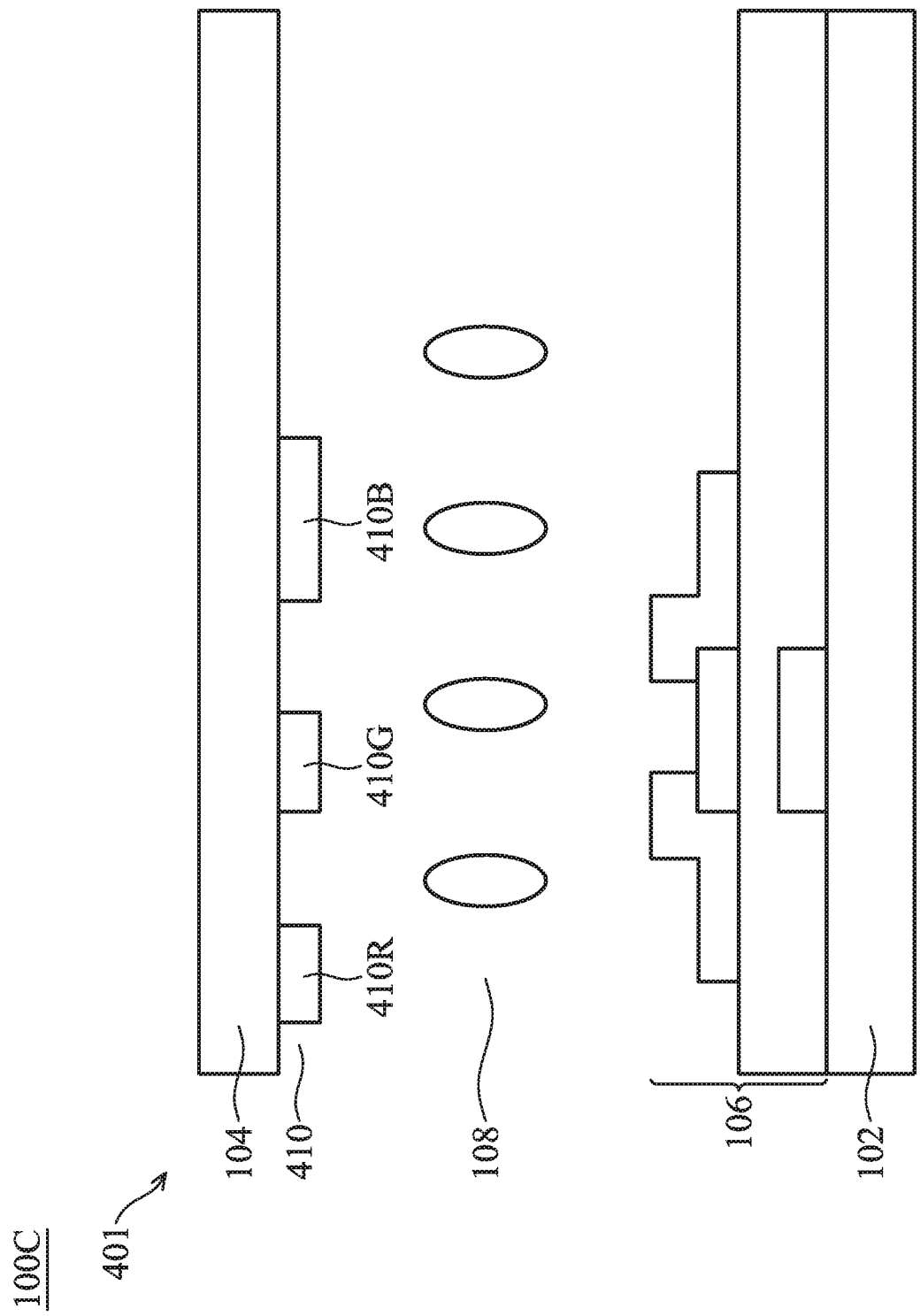
FIG. 8 is a schematic view of a display device according to the fourth embodiment of the present disclosure.

Please refer to FIG. 8, which is a schematic view of a display device 100C according to a fourth embodiment of the present disclosure (where the backlight module BL is omitted). As shown in FIG. 8, by adjusting the opening ratio of the sub-pixels corresponding to the regions of the red filter 410R, the green filter 410G, and the blue filter 410B in the display panel 401, the light chromaticity of the display panel 401 can be further adjusted. For example, in this embodiment, in the display panel 401 of the display device 100C, the sub-pixel opening ratio corresponding to the blue filter portion 410B is higher (in FIG. 8, it is represented by the area of the blue filter portion 410B being greater than the red filter portion 410R and the green filter portion 410G), and the chromaticity of the light emitted from the display panel 401 changes, for example, it is more bluish.

Fifth Embodiment

Figure 9:
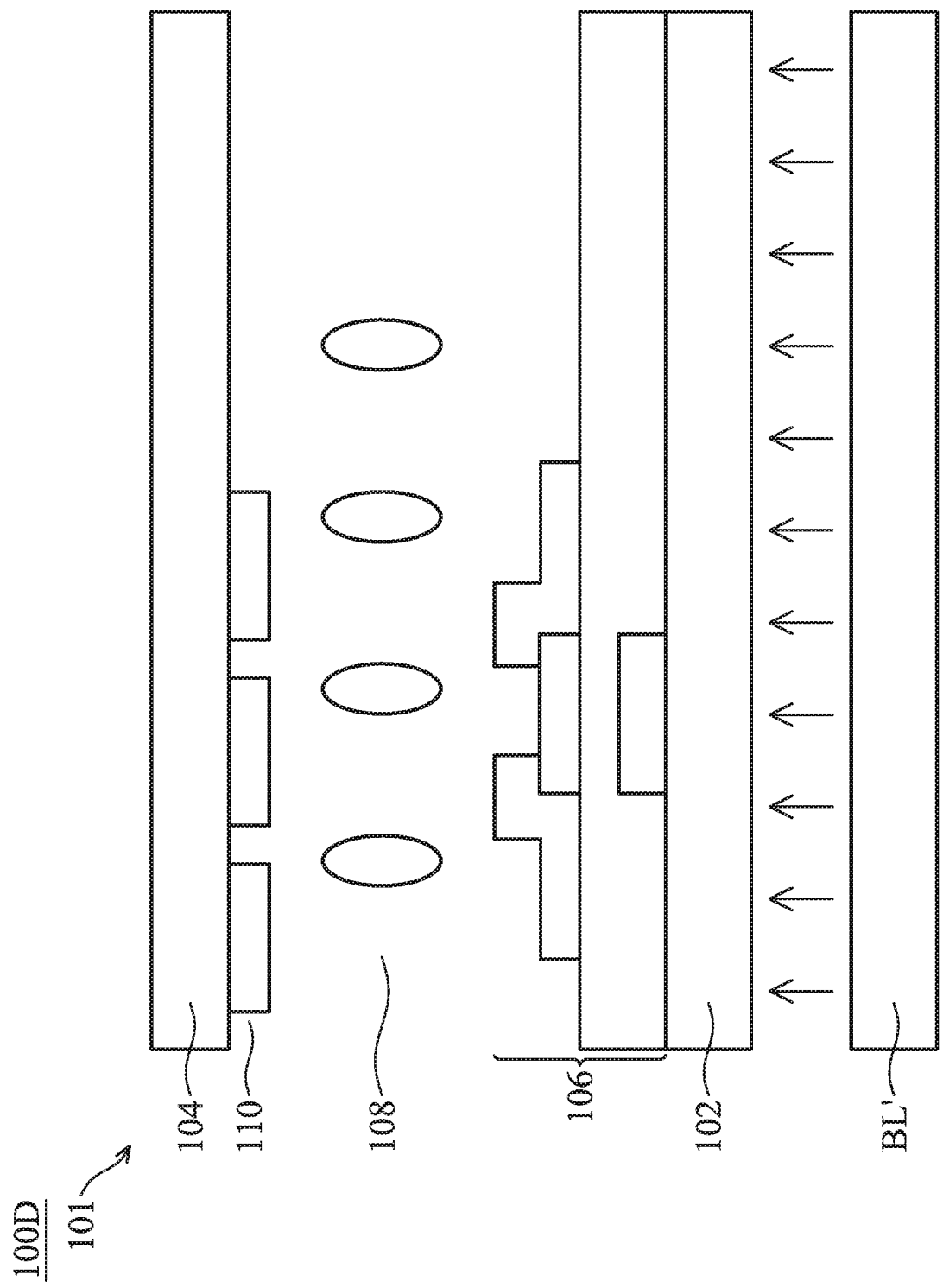
FIG. 9 is a schematic view of a display device according to the fifth embodiment of the present disclosure.

Please refer to FIG. 9, which is a schematic view of a display device 100D according to a fifth embodiment of the present disclosure. Compared with the first embodiment (FIGS. 1-2), this embodiment has a backlight module BL' which emits light that is more bluish than the backlight module BL in the First Embodiment. That is, it is closer to the standard origin (0,0) of the CIE 1931 xy chromaticity coordinate than the first light transmission chromaticity coordinate (x1, y1). In this way, the light chromaticity of the overall display device 100D can be more bluish.

It should be noted that the method of changing the opening ratio of the sub-pixels in the fourth embodiment and the method of changing the light chromaticity of the backlight module in the fifth embodiment can be used independently or combined with other embodiments, to compensate for the light chromaticity of the display device.

In summary, the present disclosure provides a display device, including a first flexible substrate, a second flexible substrate, a TFT circuit, and a liquid-crystal layer. The TFT circuit is formed on the first flexible substrate. The liquid-crystal layer is sealed between the first flexible substrate and the second flexible substrate. The first flexible substrate has a first light transmission chromaticity coordinates (x1, y1), and the second flexible substrate has a second light transmission chromaticity coordinates (x2, y2), wherein x1-x2≥0.002 or y1-y2≥0.002.

The embodiment of the present disclosure has at least one of the following advantages or effects. Through the chromaticity difference between the first flexible substrate and the second flexible substrate in the CIE 1931 xy chromaticity coordinate, ((x1, y1) and (x2, y2), wherein x1-x2≥0.002 or y1-y2≥0.002), the light chromaticity of the display device can be compensated, and the chromaticity of the light can be adjusted. In addition, by adjusting the opening ratio of a sub-pixel, such as the sub-pixel corresponding to a specific color in the color filter having a higher opening ratio, or adjusting the chromaticity of the light emitted by the backlight module, the light chromaticity of the display device can also be adjusted.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications, combinations and variations can be made in the disclosure. It is intended that the standard and examples be considered as exemplary only, with the true scope of the disclosed embodiments being indicated by the following claims and their equivalents.

What is claimed is:

1. A display device comprising:
   a first flexible substrate;
   a second flexible substrate;
   an electrode layer provided on the first flexible substrate;
   a TFT circuit formed on the first flexible substrate; and
   a liquid crystal layer sealed between the first flexible substrate and the second flexible substrate,
   wherein the first flexible substrate has a first light transmission chromaticity coordinates (x1, y1), the second flexible substrate has a second light transmission chromaticity coordinates (x2, y2), and
   wherein x1−x2≥0.002 or y1−y2≥0.002.

2. The display device according to claim 1, wherein the x1-x2≥0.002 and y1-y2≥0.002.

3. The display device according to claim 1, wherein the x1-x2≥0.005 or y1-y2≥0.005.

4. The display device according to claim 3, wherein the x1-x2≥0.005 and y1-y2≥0.005.

5. The display device according to claim 1, wherein the x1-x2≥0.030 or y1-y2≥0.030.

6. The display device according to claim 1, wherein the first flexible substrate comprises a first polymer layer which has a first atomic concentration of an element selected from a group consisting of Si, F, Ge, and C, the second flexible substrate comprises a second polymer layer which has a second atomic concentration of the element, and the first atomic concentration is different from the second atomic concentration.

* * * * *